2 Sheets--Sheet 1.

C. R. JENNE.
Carriage-Wheels.

No. 152,951. Patented July 14, 1874.

WITNESSES
Robert Everitt
G. E. Alphaeus

BY

INVENTOR
C. R. Jenne
Chipman Hosmer &c.
ATTORNEYS.

THE GRAPHIC CO. PHOTO-LITH. 39 & 41 PARK PLACE, N.Y.

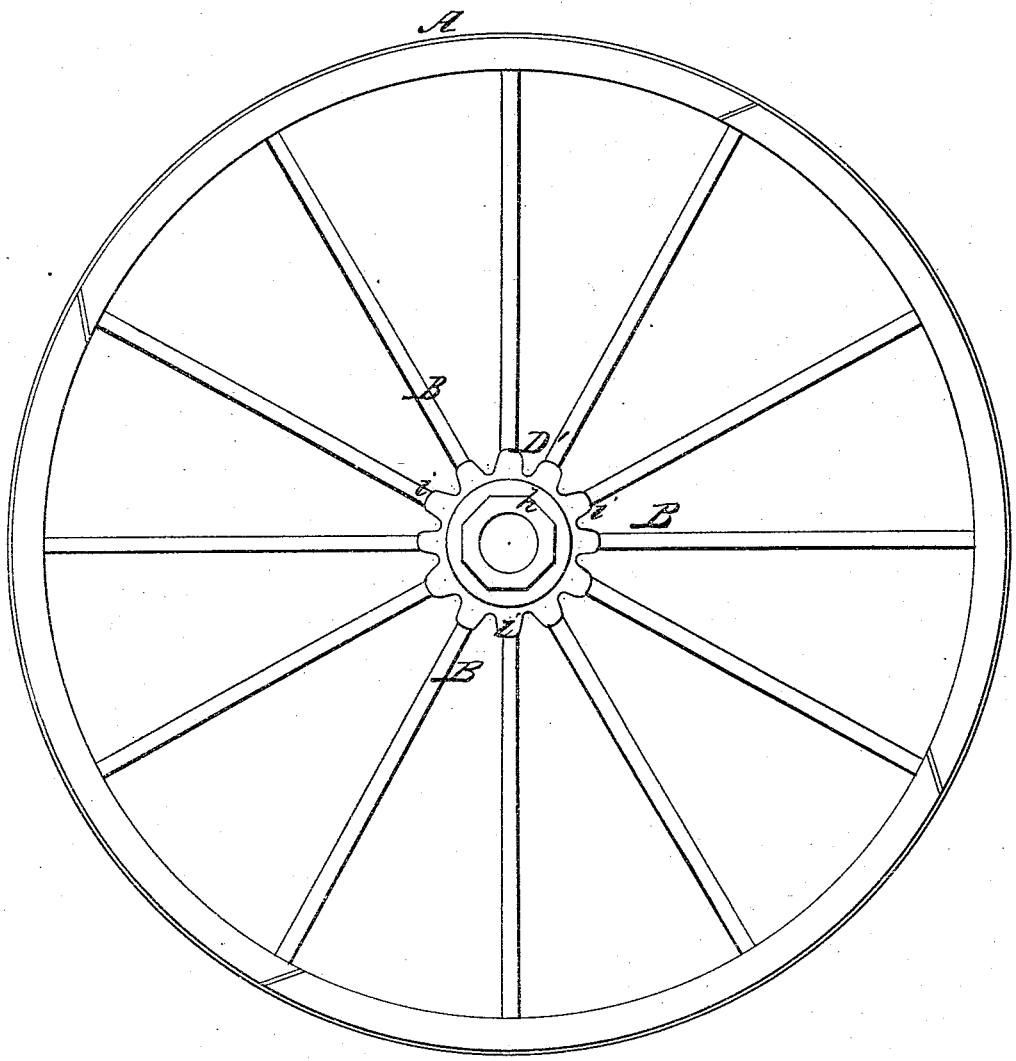

UNITED STATES PATENT OFFICE.

CHANCY R. JENNE, OF OKOLONA, MISSISSIPPI.

IMPROVEMENT IN CARRIAGE-WHEELS.

Specification forming part of Letters Patent No. 152,951, dated July 14, 1874; application filed May 29, 1874.

*To all whom it may concern:*

Be it known that I, CHANCY R. JENNE, of Okolona, in the county of Chickasaw and State of Mississippi, have invented a new and valuable Improvement in Wheels; and I do hereby declare that the following is a full, clear, and exact description of the construction and operation of the same, reference being had to the annexed drawings, making a part of this specification, and to the letters and figures of reference marked thereon.

Figure 1:
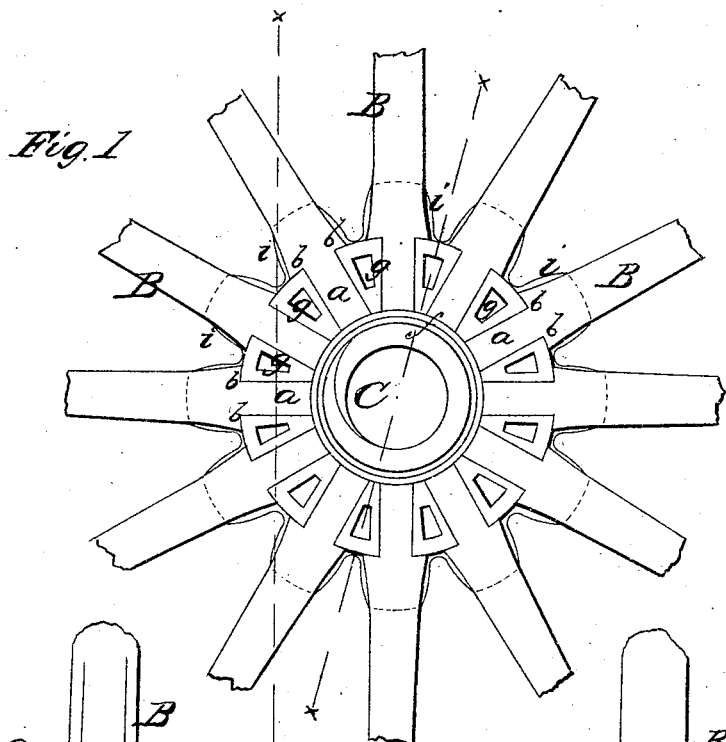
Figures 2, 3:
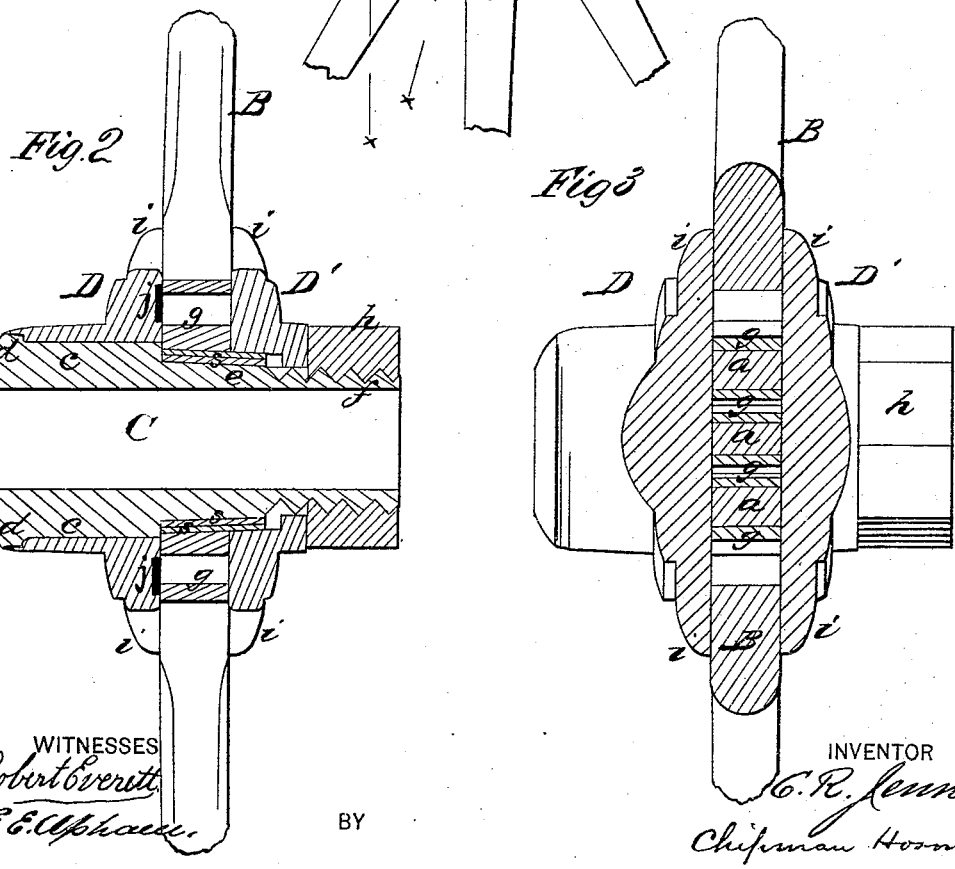

Figure 1 of the drawing is a representation of a plan view of my wheel, and Figs. 2 and 3 are sectional views. Fig. 4 is a view of my finished wheels.

This invention has relation to spoked wheels for vehicles; and it consists in the use of separated segments or wedges between the tenons of the spokes, in combination with two clamping-collars, a conical hub, and expanding sleeves, whereby the spokes can all be rigidly secured in their places and tightened, should they at any time become loose, and whereby any one or more of the spokes can be conveniently removed and others substituted without removing the tire from the wheel.

The following is a description of my improved wheel:

In the annexed drawings, A designates the tire, which may be constructed with its inner side concave transversely to receive the convex surface of the rim of the wheel; or, if desired, the tire may be made flat on both sides and secured on the wheel in the usual well-known manner. B B designate the spokes, having tenons $a$ and shoulders $b\ b$ formed on them. C designates a hub having a hole through its center to receive the axle, and constructed with a cylindrical enlargement, $c$, an annular shoulder or head, $d$, a conical portion, $e$, and a screw-threaded portion, $f$. D designates a clamping-collar, which is applied on the cylindrical portion $c$ of the hub, and which is constructed with narrow extensions, $i$, on its periphery, which are separated by notches, and which are designed to serve in combination with similar extensions $i$ on the periphery of a clamping-collar, D', for giving strength and rigidity to the wheel. When the spokes are all inserted into the fellies, the hub C is inserted through the space surrounded by the tenons, after which wedges or segments $g$ are pressed into the spaces between the tenons $a$, the shoulders $b$, and the tapered portion $e$ of the hub; the collar D' is then applied on the hub and forcibly set up by means of a nut, $h$. This clamps the segments and tenons between the collars D D', and expands the parts so as to render rigid the entire wheel. Before applying the hub to its place, I slip one or more thin tubes, $s$, of conical form, on the tapered portion $e$, thereby enabling me to secure any desired amount of expansion. Should the spokes become loose, they can be readily tightened by the use of one or more tubes, $s$, in addition to those which were at first applied on the tapered portion of the hub.

It will be seen from the above description that a broken spoke can be readily removed from the wheel and a new one substituted without disturbing the other spokes or removing the tire; also, that the wheel can be tightened at pleasure; also, that the extensions $i$ on the clamping-collars reach well over the spokes, beyond the outer ends of the wedges $g$, and greatly strengthen the wheel, without materially adding to its weight.

I am aware that a hub having a concentric portion, a recessed cap, and confining-nuts is not new, and therefore do not claim such invention, broadly; but

What I claim as new, and desire to secure by Letters Patent, is—

In a wheel-hub, the combination of the separated wedges $g$ between the tenons of the spokes, the clamping-collars D D', with extensions $i$, the conical portion $e$, and expanding sleeves $s$, substantially as and for the purpose set forth.

In testimony that I claim the above, I have hereunto subscribed my name in the presence of two witnesses.

CHANCY R. JENNE.

Witnesses:
O. WEBB SMITH,
W. H. JOHNSON.